July 7, 1953  R. A. CHRISTIAN ET AL  2,644,636
CONTROL MECHANISM FOR ACCOUNTING MACHINES
Original Filed Dec. 6, 1947  12 Sheets-Sheet 1

INVENTORS
RAYMOND A. CHRISTIAN
& JESSE R. GANGER

BY

THEIR ATTORNEYS

July 7, 1953  R. A. CHRISTIAN ET AL  2,644,636
CONTROL MECHANISM FOR ACCOUNTING MACHINES
Original Filed Dec. 6, 1947  12 Sheets-Sheet 2
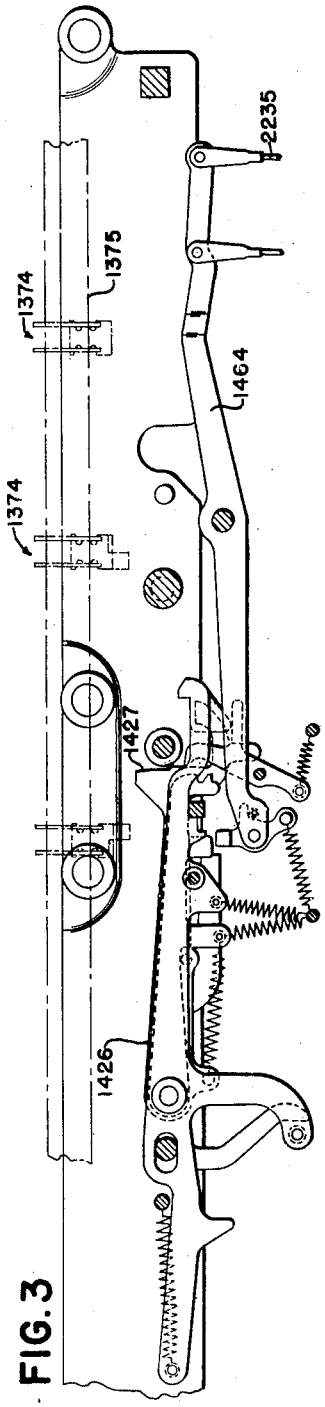
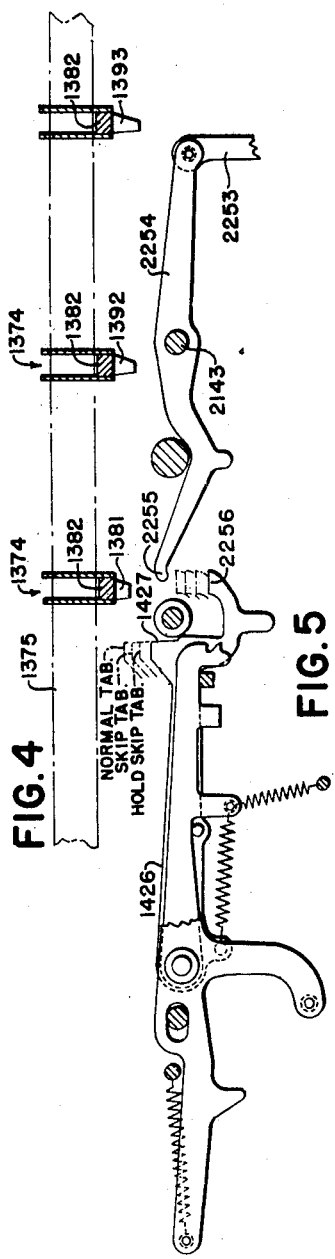
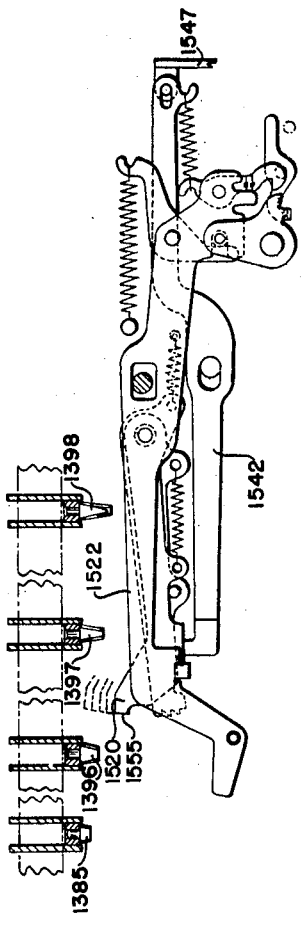
INVENTORS
RAYMOND A. CHRISTIAN
& JESSE R. GANGER
THEIR ATTORNEYS July 7, 1953 R. A. CHRISTIAN ET AL 2,644,636
CONTROL MECHANISM FOR ACCOUNTING MACHINES
Original Filed Dec. 6, 1947 12 Sheets-Sheet 3
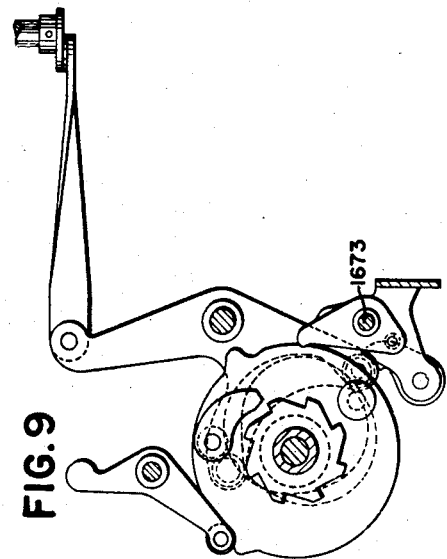
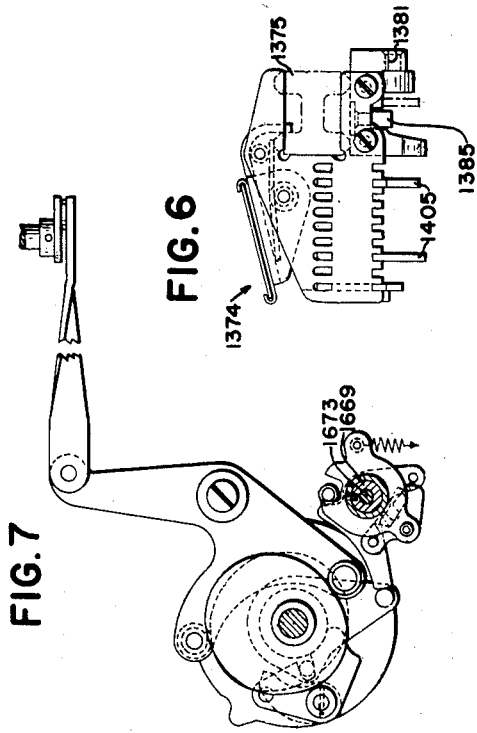
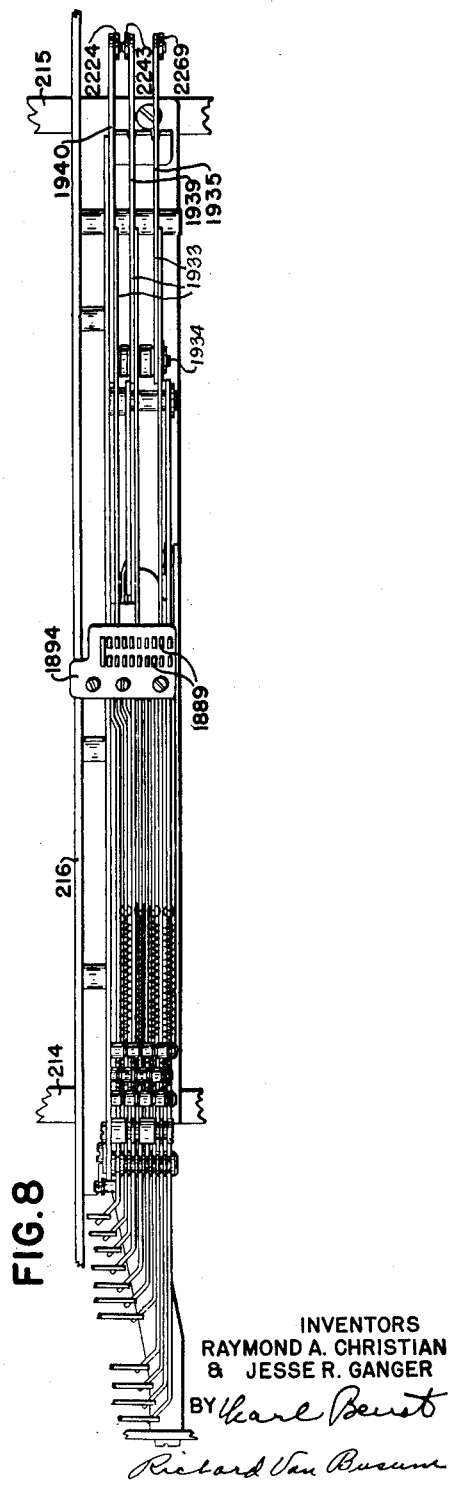
INVENTORS
RAYMOND A. CHRISTIAN
& JESSE R. GANGER
BY
THEIR ATTORNEYS

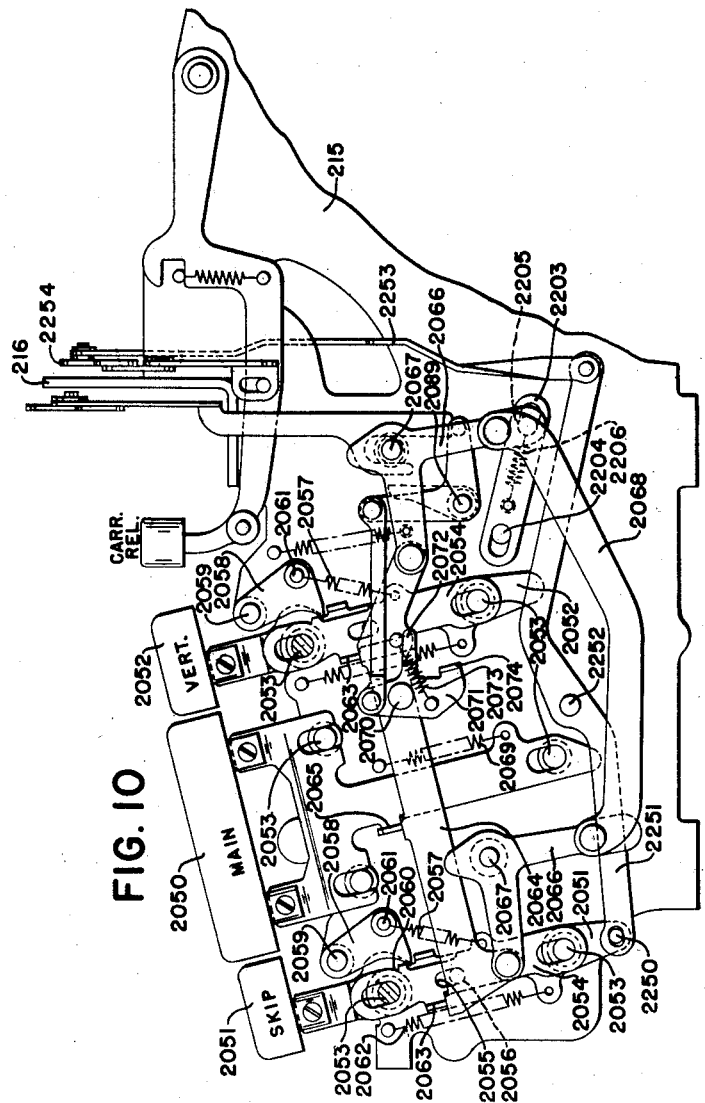
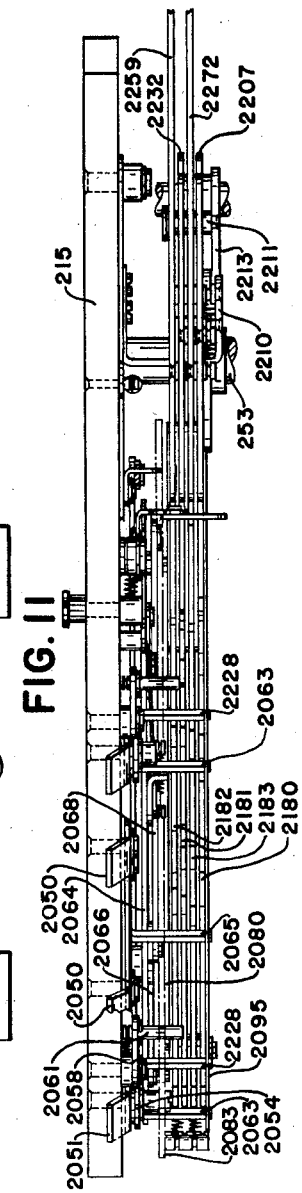

July 7, 1953  R. A. CHRISTIAN ET AL  2,644,636
CONTROL MECHANISM FOR ACCOUNTING MACHINES
Original Filed Dec. 6, 1947  12 Sheets-Sheet 5

INVENTORS
RAYMOND A. CHRISTIAN
& JESSE R. GANGER

BY *Earl Beust*
*Richard Van Braam*

THEIR *Attorneys*

July 7, 1953

R. A. CHRISTIAN ET AL 2,644,636

CONTROL MECHANISM FOR ACCOUNTING MACHINES

Original Filed Dec. 6, 1947

(REVERSE TABULATION)

(FORWARD TABULATION)

INVENTORS
RAYMOND A. CHRISTIAN
& JESSE R. GANGER

BY Earl Beust
Richard Van Buren

THEIR Attorneys

July 7, 1953     R. A. CHRISTIAN ET AL     2,644,636
CONTROL MECHANISM FOR ACCOUNTING MACHINES
Original Filed Dec. 6, 1947     12 Sheets-Sheet 8
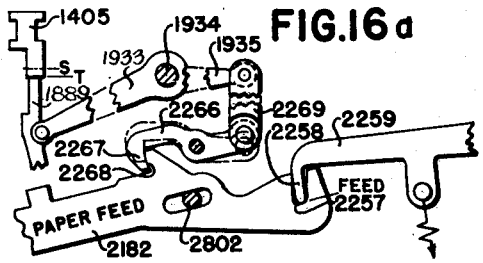
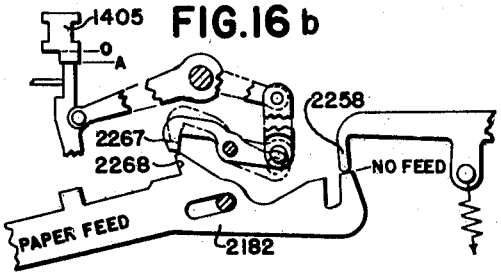
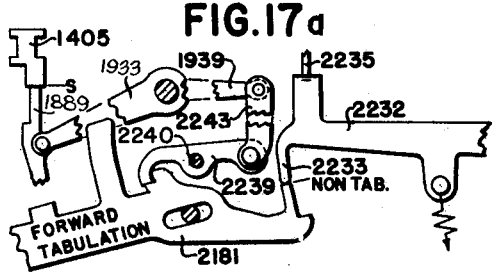
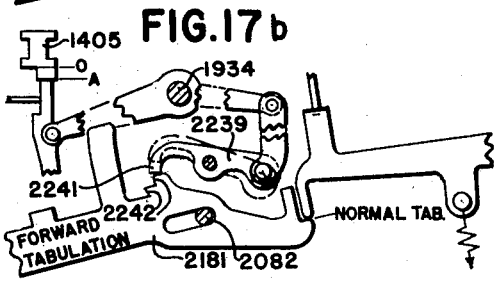
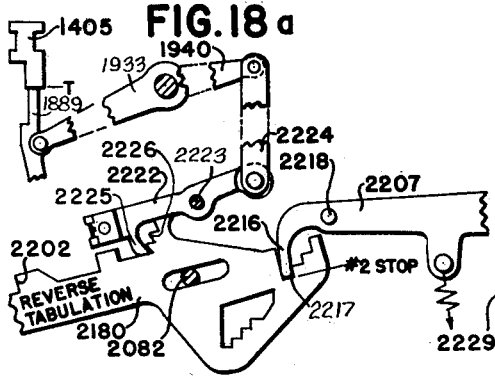
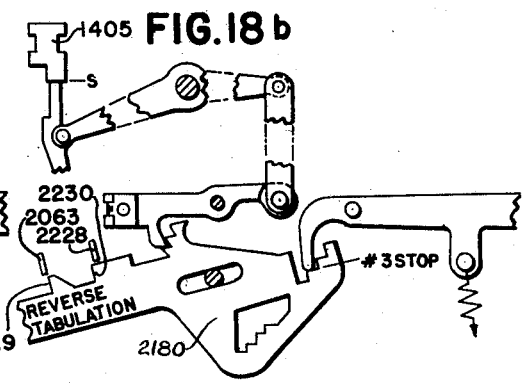
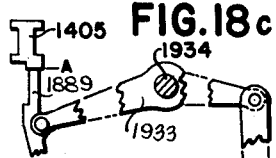
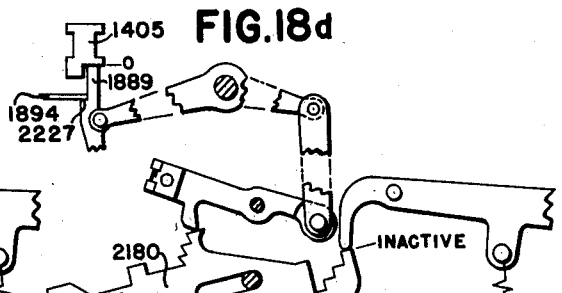
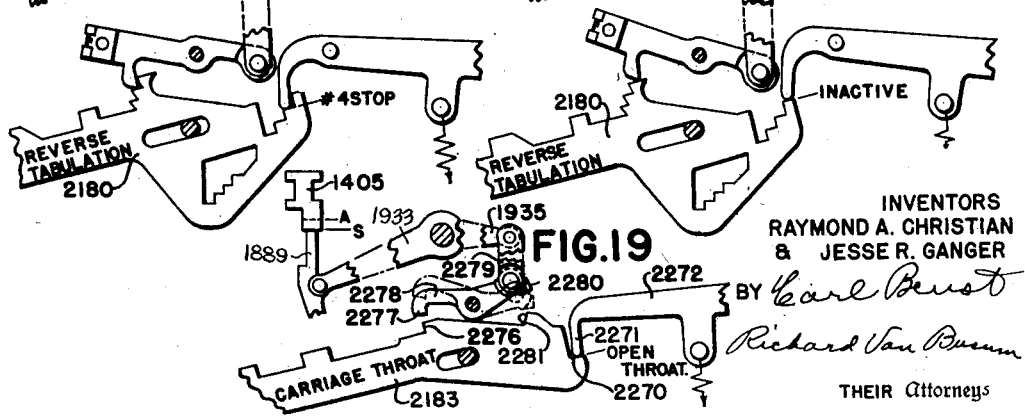
INVENTORS
RAYMOND A. CHRISTIAN
& JESSE R. GANGER
THEIR Attorneys

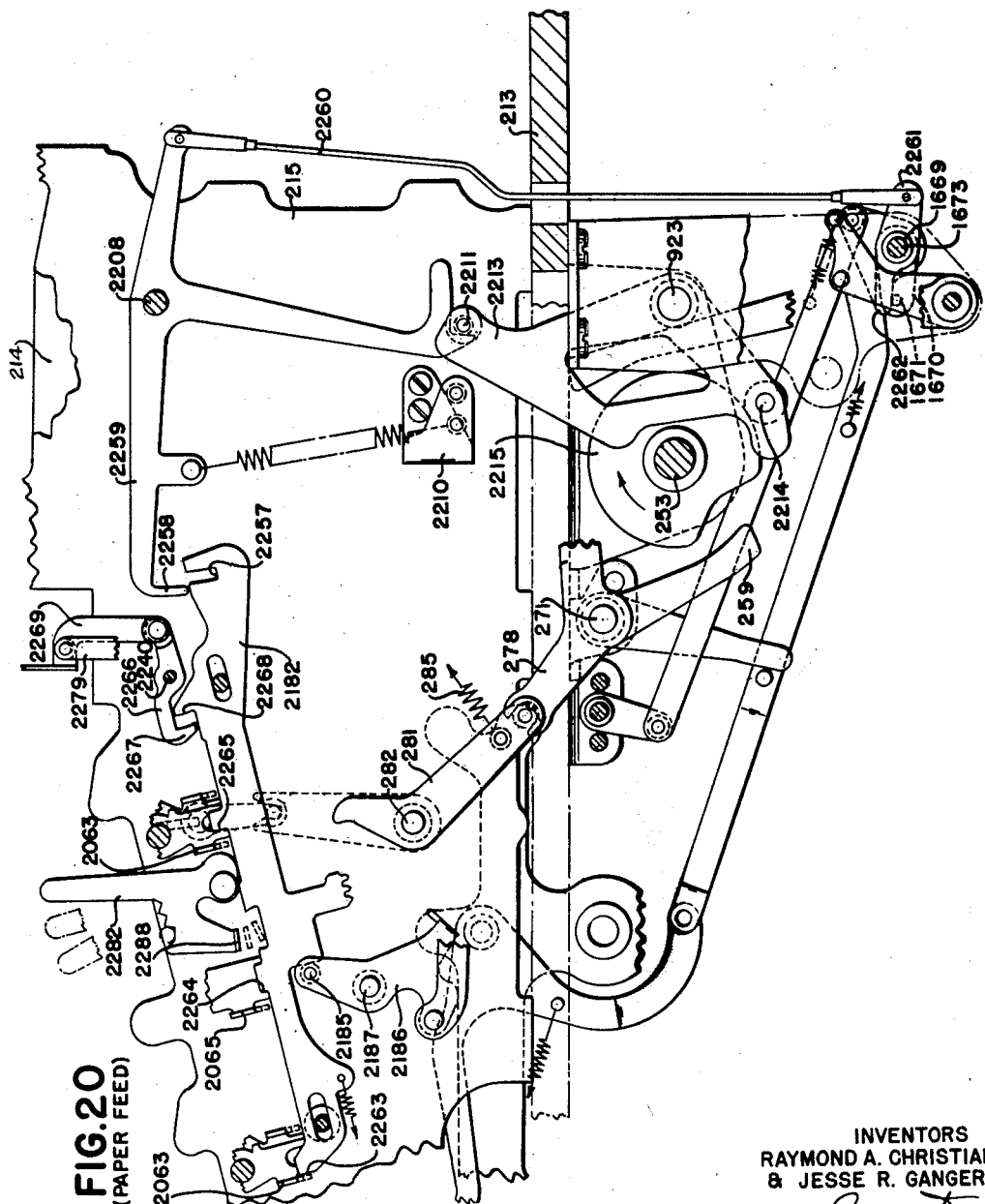

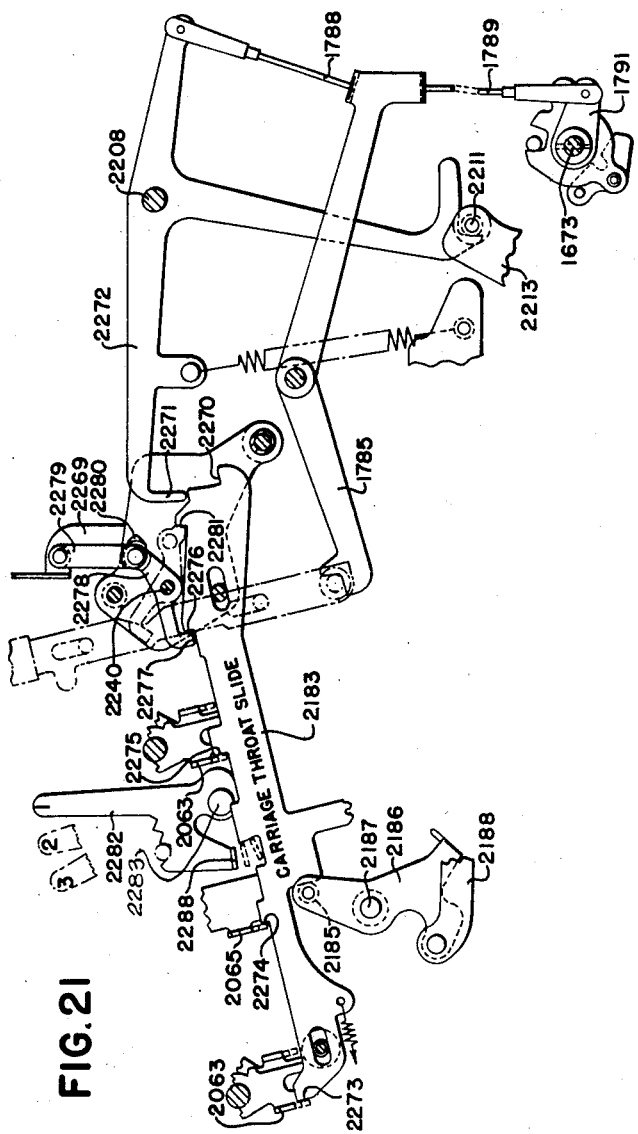

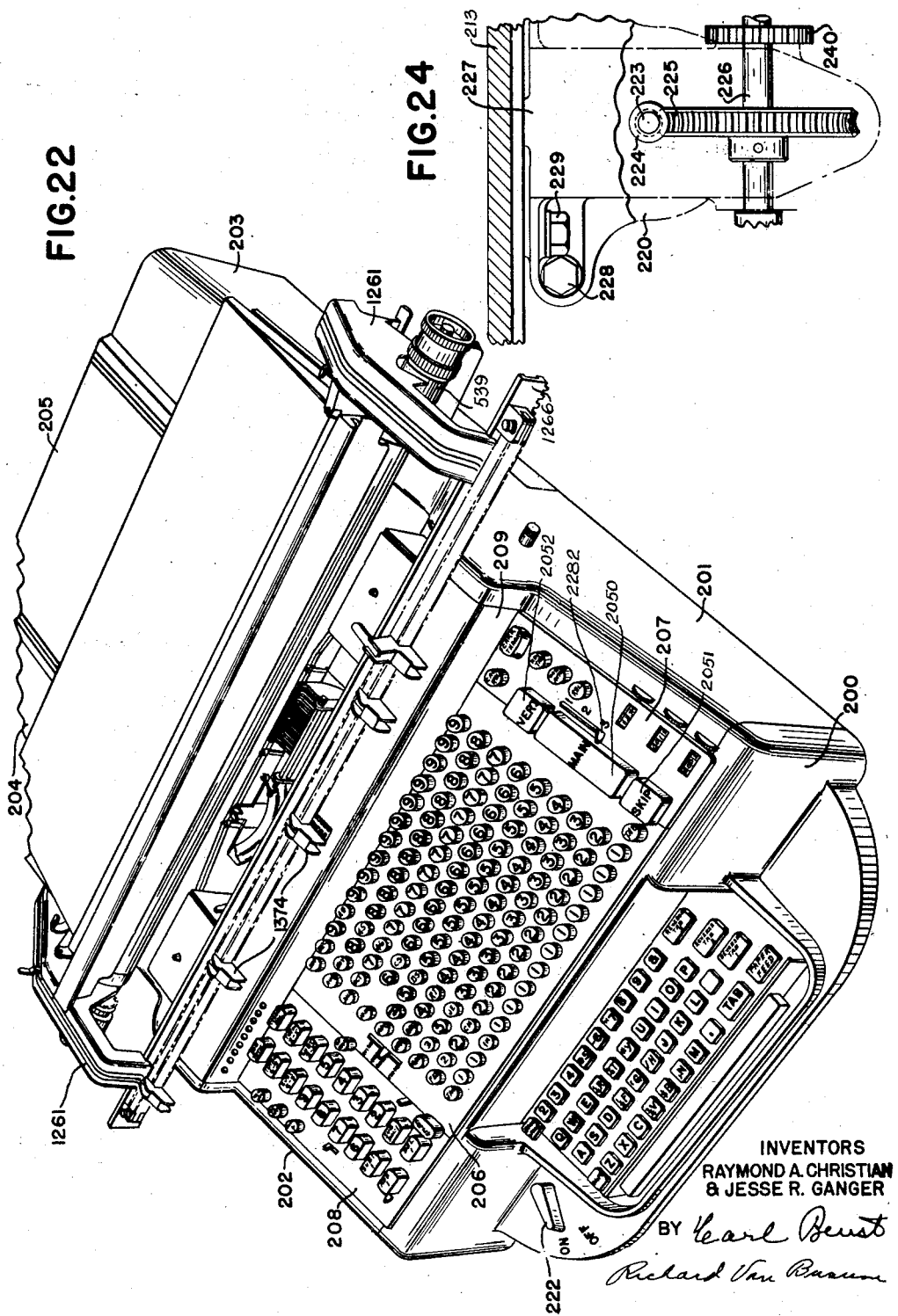

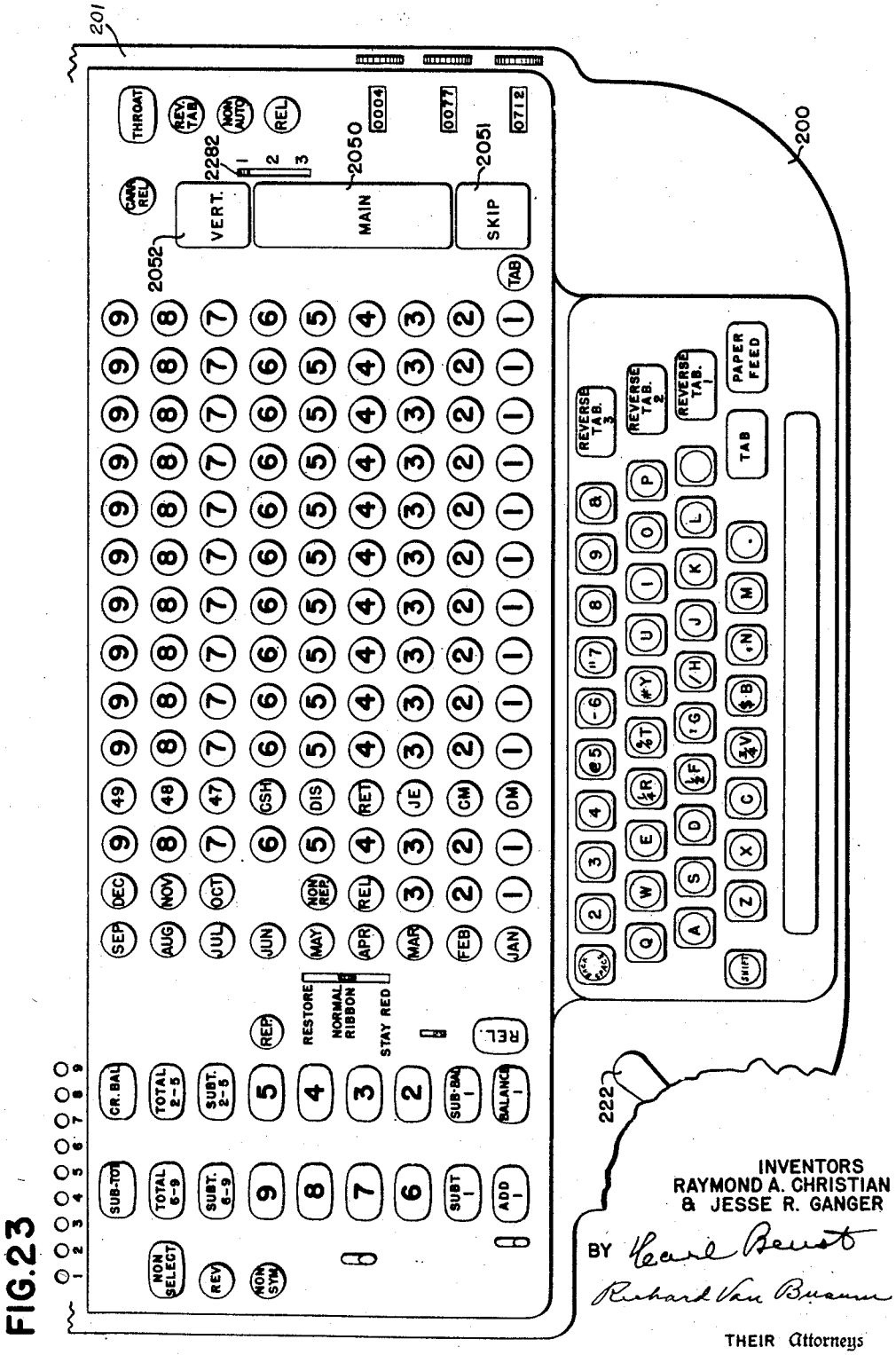

Patented July 7, 1953

2,644,636

UNITED STATES PATENT OFFICE 2,644,636

CONTROL MECHANISM FOR ACCOUNTING MACHINES

Raymond A. Christian and Jesse R. Ganger, Dayton, Ohio, assignors to The National Cash Register Company, Dayton, Ohio, a corporation of Maryland Original application December 6, 1947, Serial No. 790,032. Divided and this application May 9, 1951, Serial No. 225,311

14 Claims. (Cl. 235—60.47)

The present invention relates to calculating machines and particularly to machines of the accounting or bookkeeping type which are provided with a traveling paper carriage for supporting the bookkeeping forms and also for automatically controlling the various functions of the machine in accordance with the columnar positioning of the carriage.

This application is a division of the co-pending application for United States Letters Patent filed on December 6, 1947, by Raymond A. Christian et al., Serial No. 790,032.

In the business world of today, there are nearly as many different types of bookkeeping systems employed as there are separate business organizations. It has, therefore, been necessary for the builders of bookkeeping or accounting machines to modify the designs of their machines frequently in order to adapt them to the particular bookkeeping system employed by the prospective purchaser. These so-called "customer order" machines are costly to build, since certain portions of the machine must be practically handmade in order to furnish a machine having the desired characteristics.

Accordingly, it is an object of the present invention to provide a solution to this problem of adapting a particular type of accounting machine to fit the bookkeeping system utilized by any particular customer. This has been done in the present instance by designing an accounting or bookkeeping machine which is sufficiently flexible in character that it may be used in connection with practically any of the complex accounting systems used by present-day business establishments.

Another problem confronting both the manufacturers and the users of accounting machines is the complexity of many of our present bookkeeping systems. Not only is it difficult to construct machines which are capable of performing the many and complicated operations involved, but it is also difficult for the operator of the machine to learn how to manipulate the various controls of the machine so as to properly perform the various operations involved in making an entry on the books. It is, therefore, a further object of the invention to provide a bookkeeping machine which will perform most of these operations automatically and therefore require a minimum amount of time and attention on the part of the operator of the machine.

In order to better enable the machine embodying the present invention to handle the complicated present-day bookkeeping procedures, it is provided with a large number of totalizers which may be selected simultaneously in various combinations for either additional or subtraction, so as to enable postings to be made into a large number of separate accounts during a single machine cycle.

Another object of the invention resides in the provision of novel means for controlling the various functions of the machine either from the traveling paper carriage, from the several motor bars for initiating cycles of operation of the machine, or from certain of the manipulative keys situated on the keyboard of the machine.

A further object of the invention is to provide a plurality of slides operating under the control of the motor bars, the traveling paper carriage, and the motor bar control lever for controlling certain functions of the machine. This control mechanism is designed in such a manner that any of the controlling elements (motor bars, etc.) may be arranged to stop any of the slides in any of their various positions, thereby affording the maximum amount of flexibility in the control of the machine by this mechanism.

It is a further object of the invention to provide a novel mechanism for causing the reverse tabulating mechanism for the traveling carriage to be set into operation by a device which is actuated by the power-driven roller of the electric typewriter which forms a part of the present machine.

With these and other objects in view which will become apparent from the following description, the invention includes certain novel features of design and combinations of parts, a preferred form or embodiment of which is hereinafter described with reference to the drawings which accompany and form a part of this specification.

Figure 3 is a front view of the forward tabulating mechanism provided in the present machine.

Figure 4 is a view showing a portion of the forward tabulating mechanism and also the means for controlling the operation of this mechanism from the "Skip" motor bar.

Figure 5 is a front view of the reverse tabulation mechanism incorporated in the present machine.

Figure 6 is a detail view of one of the carriage stops which is used to control the various functions of the machine.

Figure 7 is a right side elevation of the paper feed clutch mechanism.

Figure 8 is a plan view showing the sensing levers which cooperate with the carriage stops for the purpose of controlling the various machine functions.

Figure 9 is a view of the front feed clutch as it appears from the right-hand side of the machine.

Figure 10 is a right side elevation of the various motor bars and the cycle-initiating mechanism associated therewith.

Figure 11 is a plan view of the mechanism illustrated in the preceding figure.

Figures 16a and 16b are diagrammatic views showing the control by the traveling paper carriage over the paper feed slide.

Figures 17a and 17b are diagrammatic views showing the control by the traveling paper carriage over the forward tabulation slide.

Figures 18a, 18b, 18c, and 18d are diagrammatic views illustrating the control by the traveling paper carriage over the reverse tabulation slide.

Figure 19 is a diagrammatic view illustrating the control by the carriage over the carriage throat slide.

Figure 20 is a right side view showing the means by which the motor bars and the traveling paper carriage control the paper-feeding mechanism of the machine.

Figure 21 is a view showing the means whereby the motor bars and the traveling paper carriage control the carriage throat mechanism of the machine.

Figure 22 is a perspective view of the complete machine.

Figure 23 is a plan view of the keyboard of the combined typewriting and accounting machine disclosed herein.

Figure 24 is a front view of a portion of the motor-drive mechanism for the machine.

GENERAL DESCRIPTION

Certain of the principles and features of the machine hereinafter to be described are disclosed in the following United States patents:

| | | |
|---|---|---|
| 1,197,276 | September 5, 1916 | Halcolm Ellis |
| 1,203,863 | November 7, 1916 | Halcolm Ellis |
| 1,819,084 | August 18, 1931 | Emil John Ens |
| 2,038,717 | April 28, 1936 | Raymond A. Christian |
| 2,079,355 | May 4, 1937 | Charles L. Lee |
| 2,181,975 | December 5, 1939 | Charles L. Lee |
| 2,189,851 | February 13, 1940 | Paul H. Williams et al. |
| 2,217,221 | October 8, 1940 | Jesse R. Ganger |
| 2,243,806 | May 27, 1941 | Laurence N. Lehman |
| 2,316,520 | April 13, 1943 | Henry F. Lang |

Reference is also made to United States Letters Patent No. 2,442,402, issued June 1, 1948, to John T. Davidson et al. and entitled "Accounting Machines," for a further disclosure of certain of the features incorporated in the machine to be described hereinafter.

The basic structure of the present machine is patterned after the machine shown in the foregoing patents, which has been on the market for many years. For example, the construction and arrangement of the keyboard, the differential actuators, the printer, and the totalizers are practically identical with the corresponding mechanisms shown in the patents. The basic structure of the prior art machine is disclosed in the Ellis Patent No. 1,197,276, while an add-subtract totalizer of the same general type as that used in the present machine is disclosed in Ellis Patent No. 1,203,863. The totalizer engaging and disengaging mechanism, on the other hand, is shown in the above-mentioned Davidson et al., Patent No. 2,442,402. Most of the mechanisms for controlling the various machine functions, however, are new in the subject machine, as are also the paper carriage and the controlling mechanisms therefor. In addition, the instant machine is equipped with an electric typewriter which is driven by the same motor that operates the remainder of the machine. With this brief overall description in mind, the various parts of the machine will now be described in detail, so as to provide a full and complete understanding of the entire device.

Figure 1:
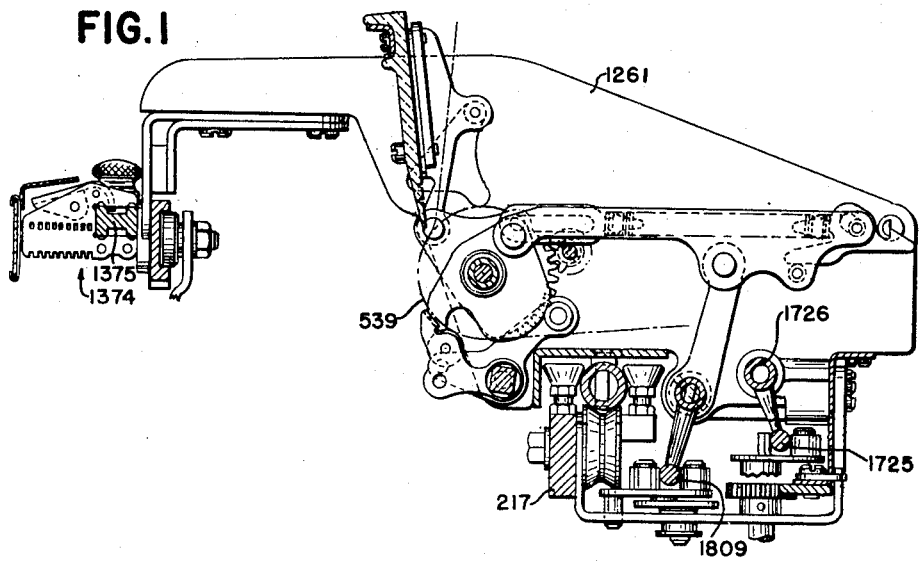
Figure 1 is a cross-sectional view taken through the traveling paper carriage of the machine, showing in particular the front feed mechanism thereof. In this view, the mechanism is in its closed position.

GENERAL ORGANIZATION AND CABINET (Figure 1)

A perspective view of the machine as a whole is shown in Figure 22 of the drawings, and a general understanding of the layout and organization of the machine may be obtained from this illustration. As shown herein, a typewriter keyboard is located at the front end of the machine, while just behind and somewhat above this keyboard is an amount keyboard on which may be set up the various amounts which are to be entered in the accounting machine. To the left of the amount keyboard is a control keyboard containing the various function control keys, while to the right of it are located a plurality of motor bars and carriage control keys. In the center, just above the amount keyboard, are a group of type sectors for the accounting machine, while just to the left of these sectors is located a type basket for the electric typewriter.

Immediately behind the aforementioned printing mechanism is a rotatable platen in which accounting forms and/or other record material may be supported, this platen being mounted on a traveling carriage which is movable back and forth across the machine. Behind the paper carriage is shown that part of the machine cabinet which houses the add-subtract totalizers. At the front of the machine, just to the left of the typewriter keyboard, is a switch lever for starting and stopping a continuously running electric motor, which drives the various operating mechanisms of the machine.

As shown in Figures 22 and 23, the operating mechanism of the machine is housed in a cabinet made up of several separate sections, each of which is independently removable in order to yield access to the part of the machine lying thereunder. This cabinet is composed of a front piece 200, extending across the front of the machine and having a central opening therein for accommodating the keys of the typewriter mechanism. Located on either side of the machine are side plates 201 and 202, immediately behind which are located additional side plates 203 and 204, which cover the sides and part of the top of the totalizer section of the machine. The top of the totalizer section is further covered by a plate 205, which also extends down over its rear end and, together with similarly downwardly-extending portions on side pieces 203 and 204, serves to cover the rear of the machine.

The thus-constituted accounting machine cabinet is further complemented by keyboard cover plates 206, 207, and 208, which are provided with apertures through which extend the upper ends of barrel-type key caps. To the rear of the keyboard and extending across the machine between the side pieces 201 and 202 is an angular strip of metal 209, which encloses a carriage control mechanism which will be described in detail in a subsequent portion of this description.

FRAMEWORK

*(Figures 1, 8, and 20)*

The principal element of the machine frame is a cast iron base 213 (Fig. 20), which supports, either directly or indirectly, all of the various mechanisms going to make up the present machine. This base is generally rectangular in shape and is provided with various ribs, pads, bosses, and cut-outs for accommodating all of the various structures supported thereon or depending therefrom. Mounted on top of the base toward the front of the machine are a left side frame 214 and a right side frame 215. Extending between the upper portion of the side frames and connected thereto is an angle bar 216 (Figure 8), which serves to support the forward part of the carriage as well as the carriage control mechanisms cooperating therewith. Located behind the angle bar 216 and supported by the side frames is a rail 217 (Figure 1) for supporting the rear portion of the carriage. The angle bar 216 and the rail 217 are secured to the side frames 214 and 215 by screws. The base, the side frames, and the cross pieces for supporting the carriage constitute the main framework of the machine, although there are, of course, numerous sub-frames secured in one way or another to these main frame elements for supporting the various operating mechanisms of the machine. These sub-frames will be described in connection with the mechanisms which they support as the description proceeds.

MOTOR DRIVE

*(Figures 12, 13, 22, and 24)*

The various operating mechanisms of the present machine are driven by an electric motor 220 (Figure 24) secured to the under side of the base 213. As previously mentioned herein, the motor is adapted to operate continuously while the machine is in use and may be turned on or off by means of a single-pole, single-throw toggle switch, which may be operated from the front of the machine by means of a lever 222 (Figure 22) operably connected therewith. A speed control device or governor (not shown) is provided on the rear end of the motor shaft for the purpose of maintaining the speed of the motor essentially constant under the varying load encountered in this type of service. On the front end of the motor shaft 223 (Figure 24) is secured a worm 224, which meshes with a worm wheel 225 pinned to a shaft 226, which is journaled at either end on bearings (not shown) provided in the side walls of a gear casing 227, which is secured by bolts 228 (only one shown) to the frame of the motor 220 and by other bolts 229 (only one shown in Figure 24) to the under side of the base 213. Hence, whenever the motor is running, the shaft 226 will be driven at a reduced rate of speed through the worm 224 and the worm wheel 225. Pinned to the right end of the shaft 226 is a spur gear 240 (Figures 12 and 24), which meshes with a spur gear 242.

The gear 242 is resiliently secured to a notched wheel 250 (Figure 12) by a rubber ring (not shown), which is bonded to the gear 242 and also to a metal ring (not shown), which is rigidly secured to the wheel 250. The wheel 250 is rotatably mounted on a main cam shaft 253 by means of roller bearings (not shown).

The gear 242 and the notched wheel 250 may be engaged with the main cam shaft 253 so as to cause the shaft to be given cycles of operation. The means for engaging the gear and the wheel with the shaft 253 comprises a disc 255 having a stepped hub 256, which is pinned to the shaft 253. Loosely mounted on the step of the hub 256 is a clutch control arm 257, which is urged clockwise on the hub 256 by means of a spring 258 connected between the arm and the disc 255. The arm 257 is normally prevented from rotation in a clockwise direction under the influence of the spring 258 by means of a tripping arm 259, the end of which cooperates with an extension 260 of the arm 257. The tripping arm 259 is secured to the left-hand end of a short shaft 271, which is rotatably mounted in the machine frame and may be caused to rotate in a clockwise direction, so as to release the arm 257 to the influence of the spring 258, under the control of the several motor bars of the machine and certain other machine operation control mechanisms to be described later herein.

The upper portion of the arm 257 is provided with gear teeth 272, which mesh with corresponding gear teeth formed on a headed portion 273 of a clutch dog 274 journaled in the disc 255 near its periphery. The dog 274 passes through the disc 255 and projects into the path of a series of notches 275 provided around the periphery of the wheel 250. The under side of the dog is flattened so that it will clear the wheel and the notches when the dog is in the position shown in Figure 12. However, when the tripping arm 259 is moved away from the extension 260, the arm 257 will be rotated clockwise under the influence of the spring 258, and the dog 274 will be rotated counter-clockwise so as to cause the left-hand edge of the stud to engage with one of the notches 275 of the constantly rotating wheel 250, thereby causing the disc 255 and the main cam shaft 253 to be rotated clockwise as viewed in Figure 12. The clutch control arm 257 is limited in its movement on the hub 256 by a shoulder 276 provided on the arm 257, which shoulders cooperate with the sides of the headed portion 273 formed on the clutch dog 274. In order to brace the clutch dog 274, its upper half is surrounded by a bushing 277, which is secured to the disc 255.

Secured to the right-hand end of the shaft 271 is a two-armed lever 278 (see Figure 13), the rearwardly-extending arm of which is provided with a roll 279 and the forwardly-extending arm of which is bifurcated and engages with a stud 280 located in the lower end of a lever 281. The lever 281 is secured to the right-hand end of a shaft 282 journaled at one end in the side frame 215 and at the other end in a vertical bracket 283 (Figure 14), which is spaced to the right of the side frame 215 and secured to the base 213 by screws passing through bent-over feet 284. The lever 281 and the shaft 282 are urged counterclockwise by a spring 285, stretched between a stud in the lever 281 and a stud mounted in the side frame 215. Hence, the spring 285 constantly tends to move the tripping arm 259 clockwise out of engagement with the extension 260, so as to engage the clutch and cause the main cam shaft 253 to be rotated clockwise, as viewed from the right-hand side of the machine.

The main cam shaft 253 extends transversely across the machine beneath the base 213 and is journaled at either end in roller bearings (not shown), which are mounted in brackets (not shown) secured to the under side of the base.

Figure 13:
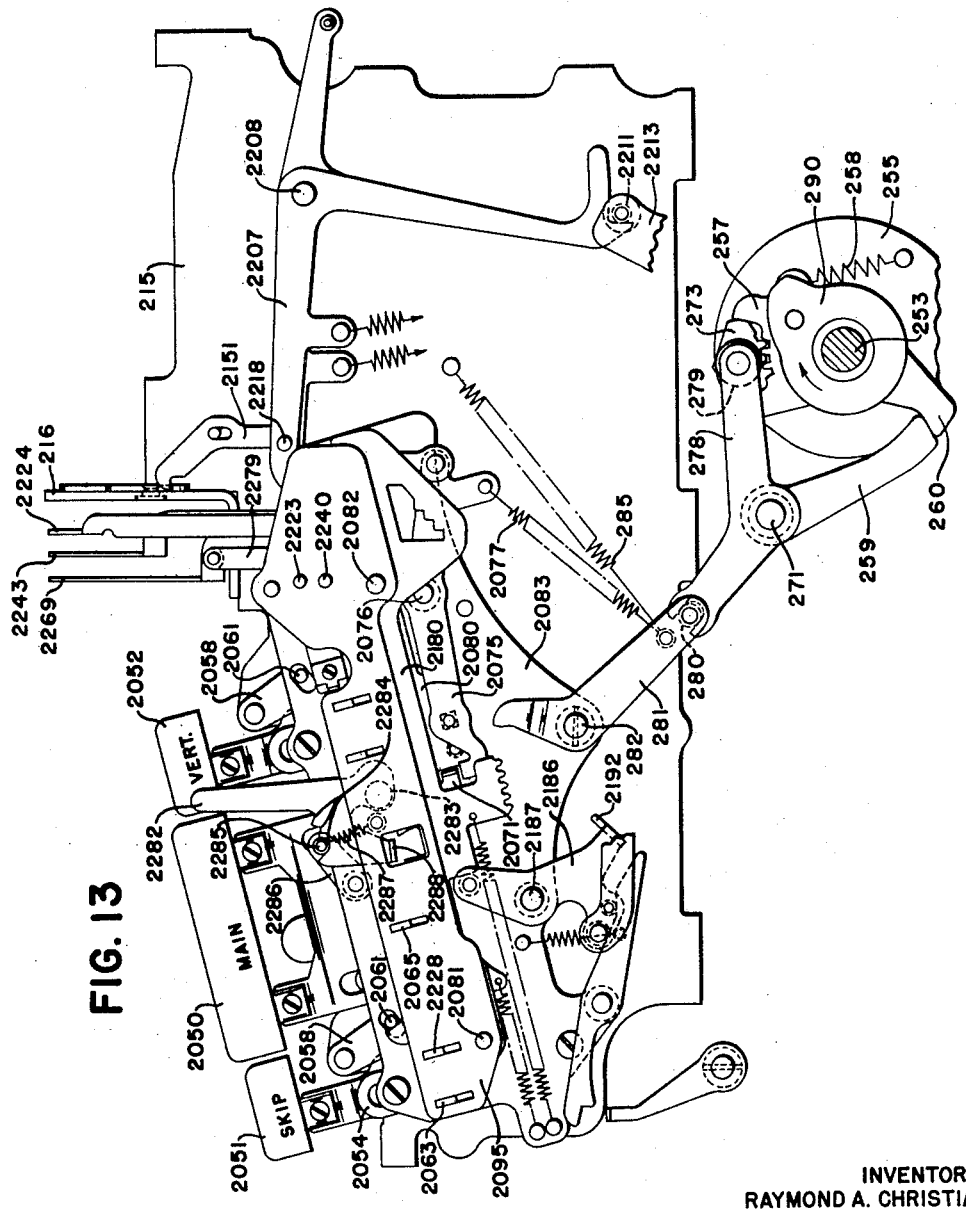
Figure 13 is a right side elevation showing the motor bars and the mechanism controlled thereby for controlling certain of the machine functions.

The cam shaft 253 has secured thereto a large number of cams for controlling various machine functions. Secured to a sleeve near the right-hand end of the cam shaft is a tripping arm restoring cam 290, which normally rotates in unison with the cam shaft 253. As shown in Figure 13, the cam 290 is provided with a lobe which engages with the roll 279 on the lever 278 at the end of one revolution of the cam shaft to thereby rotate the shaft 271 counter-clockwise and move the tripping arm 259 back into the path of the extension 260 on the clutch control arm and so cause the clutch to be disengaged. The shaft 271 and the arm 259 are retained in their restored positions, against the urgency of the spring 285, by means of a mechanism which will be described later on herein in connection with the motor bars of the machine.

In order to insure that the main cam shaft will complete its movement into its home position after the clutch has been disengaged, a homing cam 292 is secured to the cam shaft 253 (Figure 12) and is provided with a camming face 293, which cooperates with a roller 294 mounted on a pivoted lever 295, which is biased by a strong spring 296 in such a direction as to press the roller against the camming face 293 and thereby rotate the shaft 253 into its home position, as shown in Figure 123, where the roller seats itself in a slight depression formed in the face of the cam.

From the foregoing description it will be noted that the cam shaft 253 will be positively driven by the electric motor 220 through one revolution in a clockwise direction (as viewed from the right-hand side of the machine) each time the clutch is engaged.

MOTOR BARS PER SE
*(Figures 10, 12, 13, 22, and 23)*

Figure 12:
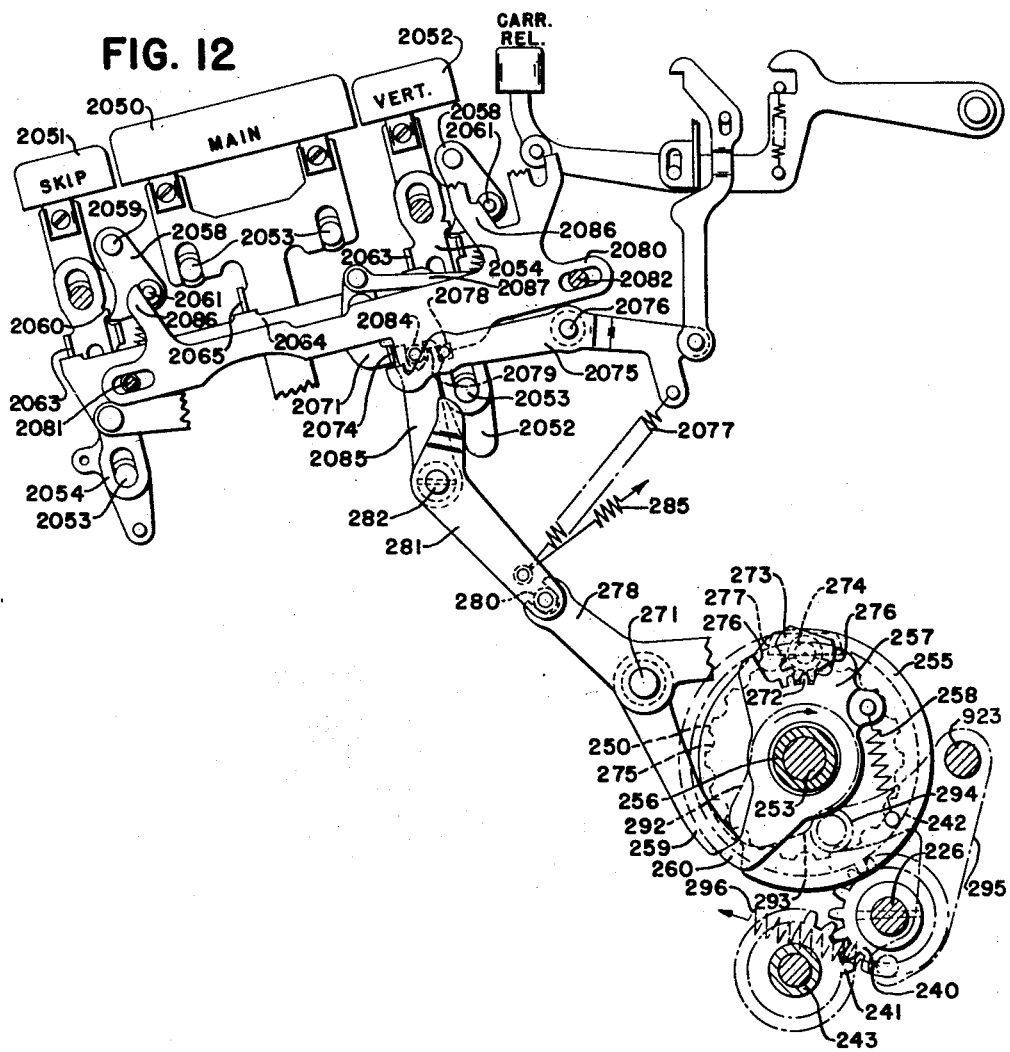
Figure 12 is a right side view showing in further detail the construction of the cycle-initiating mechanism.

As mentioned earlier herein, the present machine is provided with a plurality of motor bars located on the right-hand side of the keyboard (Figures 22 and 23), which serve to initiate operations of the machine and also to control certain functions thereof, as will be fully described in a subsequent section of this specification. The mechanism controlled by the several motor bars for causing the main clutch to be engaged and the machine to be operated is shown in Figures 10 and 12. As shown in these figures, the machine is provided with a "Main" motor bar 2050, a "Skip" motor bar 2051, and a "Vertical" motor bar 2052, which motor bars are slidably mounted on studs 2053 secured to the right side frame 215. In the case of the motor bars 2051 and 2052, an auxiliary slide 2054 is slidably mounted on the studs 2053 adjacent to the stems of the motor bars. Each slide is provided with a vertical slot 2055, which cooperates with a stud 2056 secured in the stem of the associated motor bar 2051 or 2052. Each slide is normally maintained in its raised position with the stud 2056 seated in the lower end of the slot 2055 by means of a spring 2057 stretched between the slide and a stud 2061 secured to a latch 2058 pivotally mounted on a stud 2059 secured to the right side frame. In each instance, the latch 2058 is adapted to cooperate with a notch 2060, formed in the edges of the slides, to thereby retain the latter in their lower positions whenever their associated motor bars are manipulated. Hence, depression of either of the motor bars 2051 or 2052 will cause the slides associated therewith to be carried down and retained by the latches 2058, while the motor bars themselves will be permitted to return to their raised or normal positions by means of restoring springs 2062.

Each slide 2054 is provided with a formed-over ear 2063, which engages with a finished pad formed on the top edge of a substantially horizontal link 2064. Similarly, the main motor bar 2050 is provided with a formed-over ear 2065, which engages with another finished pad provided on the upper edge of the link 2064. The link 2064 is carried by a pair of bell crank levers 2066, which are pivotally mounted on studs 2067 secured to the side frame 215. As shown in the drawings, the link is pivotally connected at either end to one of the horizontally-extending arms of the bell crank levers, while the depending arms of these levers are connected together by a link 2068, thereby causing parallel movement of the link 2064.

Mounted on the link 2064 is a stud 2070, on which is pivotally mounted a pressure arm 2071, which is provided with a finger 2072, which is urged into engagement with a spring stud mounted on the link 2064 by a spring 2073. The pressure arm 2071 is provided with a bent-over ear 2074 (see also Figure 12), which lies above the left-hand end of a lever 2075 pivotally mounted on a stud 2076 secured to an auxiliary frame plate 2083 (Figure 13), said lever being urged clockwise about the stud by means of a spring 2077. The lever 2075 carries a square stud 2078, which cooperates with a notch 2079 formed in the lower edge of a clutch control slide 2080 supported for horizontal sliding movement on studs 2081 and 2082 mounted in the auxiliary frame plate 2083. The slide 2080 carries a stud 2084, which is engaged within a bifurcation provided in the upper end of an arm 2085 secured to the shaft 282. Hence, the slide is constantly urged toward the front of the machine by means of the spring 285, but such movement is normally prevented by engagement of the square stud 2078 with the rear end of the notch 2079. Whenever any of the motor bars are depressed, however, the link 2064 and the pressure arm 2071 will be moved down so as to cause the ear 2074 to engage the end of the lever 2075 and move the square stud out of engagement with the notch on the slide, thereby permitting the latter member to be moved toward the front of the machine under the influence of the spring 285. At the same time, the arm 2085, the shaft 282, the arm 281, the lever 278, and the shaft 271 disengage the tripping arm 259 from the extension 260 of the clutch control arm, thereby causing the clutch to be engaged and the machine to be given a cycle of operation by the electric motor. A cycle of operation consists of one clockwise revolution of the main shaft 253 (Fig. 13) near the termination of which the restoring cam 290 engages the roller 279 and restores the arm 259 into the path of the extension 260 to cause the clutch to be disengaged and rotation of said shaft 253 terminated.

Since it is ordinarily desirable to cause the machine to come to rest at the end of each cycle of operation, even though the motor bar be held depressed by the operator, means is provided for enabling the square stud to reengage the notch in the control slide when the latter member is restored toward the end of the cycle by means of the restoring cam 290 (Figure 13). It will be noted from Figure 12 that the forward edge of the arm 2085 engages the ear 2074 and thus causes the pressure arm 2071 to be rocked clockwise against the tension of the spring 2073 when the slide is released for forward movement. This will cause the ear to be moved off the end of the lever 2075, thereby permitting the spring 2077 to urge the square stud into engagement with the lower edge of the slide 2080. Hence, when the slide is restored near the end of the cycle, the square stud again engages the notch 2079 and retains the tripping arm 259 in engagement with the extension 260 even though the motor bar be held depressed. When this motor bar is released, the pressure arm will again move to its raised position, and the spring 2073 will cause the ear 2074 to move over the end of the lever 2075, thus restoring the parts to the positions shown in Figures 12 and 13.

In order to release the auxiliary slides 2054 from the restraint of the latches 2058 near the end of the machine cycle, the slide 2080 is provided with a pair of latch-releasing fingers 2086, which will engage the studs 2061 on the latches as the slide is restored toward the end of the cycle to thereby disengage the latches and permit the auxiliary slides to be restored to their inactive positions by the springs 2057.

MOTOR BAR CONTROL OF FUNCTIONS

*(Figures 11, 14, 15, 16, and 21)*

In addition to initiating cycles of operation of the accounting machine, the motor bars are also effective to control certain functions of the machine, thereby enhancing the automaticity and flexibility of the machine. The mechanism for accomplishing this is shown in Figures 11, 14, 15, 16, and 21 and is composed of four function control slides 2180 to 2183 inclusive, which sense the depressed motor bars and are then themselves sensed by a feeler mechanism which controls the functioning of the machine. Each slide and its related mechanism will now be described in detail, so as to afford a complete understanding of the manner in which certain functions of the machine are controlled by the three motor bars 2050, 2051, and 2052.

REVERSE TABULATING CONTROL

Figure 14:
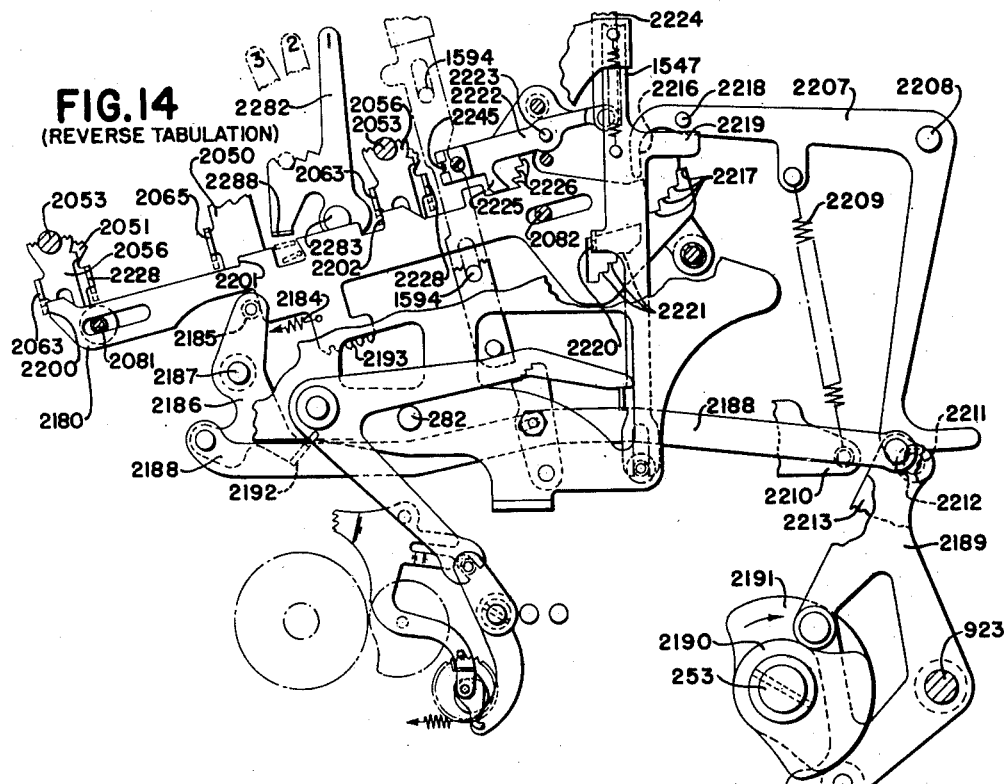
Figure 14 is a view illustrating in detail the control by the motor bars and also by the traveling paper carriage over the reverse tabulating control mechanism.

In Figure 14 is shown the slide 2180, which controls the reverse tabulation mechanism of the machine and may therefore be referred to as the reverse tabulation slide. As shown in this figure, the slide is provided with elongated slots by means of which it is slidably mounted on the studs 2081 and 2082. The slide is resiliently urged toward the front of the machine by a spring 2184 but is normally retained in its rearward position against the urgency of this spring by a rod 2185, secured in the upper end of a lever 2186, which is pivotally mounted on a stud 2187 secured to the auxiliary frame plate 2083 (Figure 13). To the lower end of the lever 2186 is pivotally connected the forward end of a link 2188, the rear end of which is pivotally connected to the upper end of a follower arm 2189, which is freely rotatable on the shaft 923 and is provided with rolls which cooperate with a pair of companion plate cams 2190 and 2191, which are secured to the main cam shaft 253. Hence, during each cycle of operation of the machine, the rod 2185 will be moved toward the front of the machine, thereby permitting the slide 2180 to be moved forwardly under the influence of the spring 2184.

The lever 2186 also carries an aliner bar 2192, which is adapted to engage the aliner notches 2193 formed in the lower edge of the slide, so as to aline and hold the slide firmly in the position which it has assumed while it being sensed by the feeling mechanism to be described presently.

The forward movement of the slide under the influence of the spring 2184 is adapted to be controlled by the three motor bars, the upper edge of the slide having shoulders 2200, 2201, and 2202 formed thereon, which are adapted to cooperate with the formed-over ears 2063 and 2065, actuated by the motor bars.

Before proceeding farther, it should be pointed out that each of the motor bars may be depressed to either one of two positions at the discretion of the operator. The first position, which is hereafter referred to as the "touch" position, is effected by applying a light pressure to the motor bars. The second position, which is hereinafter referred to as the "hold" position, requires that a considerably greater force be applied to the motor bars in order to move them into this position and hold them there. The different pressures on the motor bars are provided by a mechanism illustrated in Figure 10, which comprises a link 2203 slotted at either end, the slot in the forward end cooperating with a stud 2204 secured to the right side frame 215, and the slot in the rear end cooperating with a stud 2205 secured to the lower end of the rear bell crank lever 2066. In the normal position of the parts, a spring 2206 urges the stud 2205 into engagement with the forward end of its associated slot, while the stud 2204 is engaged with the rear end of its slot. When any one of the three motor bars is depressed, the bell crank 2066 will be rotated counter-clockwise, and the link 2203 will be moved toward the rear of the machine, thereby causing the stud 2204 to engage against the forward end of its associated slot. After this idle movement of the link has taken place, any further depression of the motor bars will cause the relatively heavy spring 2206 to be stretched as the stud 2205 moves toward the rear end of its slot. Thus, a much greater pressure must be applied to the motor bars to give them the second increment of movement, and consequently the operator of the machine will have no difficulty in feeling the two positions of the motor bars. In Figure 14, the two positions of the motor bars are shown by the dot-and-dash lines applied to the lower ends of the ears 2063 and 2065. It is further to be noted that the latches 2058 (Figure 10) will engage the notches 2060 formed in the slide 2054 after the motor bars 2051 and 2052 have been depressed to their "touch" positions, thereby causing the slides to be retained in the "touch" position after the bars have been released.

It is believed evident from the foregoing discussion that the slide 2180 may be stopped in any one of a plurality of positions under the control of the motor bars by suitably locating the shoulders 2200, 2201, and 2202 thereon with respect to the ears 2063 and 2065, and by forming the shoulders with either a high profile or a lower profile so as to engage the ears in either the "touch" position or the "hold" position, respectively, of the motor bar.

The slide having thus been differentially positioned under the control of the motor bars, its positioning is then sensed by a sensing lever 2207 (Figure 14) pivotally mounted on a stud 2208 secured to the right side frame 215. The feeler is urged counter-clockwise about said stud by a spring 2209 stretched between the lever and a bracket 2210 fastened to the right side frame.

When the machine is at rest, the sensing lever is held in the position shown in Figure 14 by a stud 2211 engaging with a heel 2212 formed on the lower end of a depending arm of the sensing lever. The stud 2211 is mounted in the upper end of a follower arm 2213 (see Figure 20), which is pivotally mounted on the shaft 923 beside the follower arm 2189 and which carries at its lower end a roll 2214, which engages the periphery of a plate cam 2215 secured to the main cam shaft 253. Hence, when the machine is put through a cycle of operation, the follower arm will be rocked clockwise, so as to release the sensing lever 2207 to the pull of the spring 2209 and thereby cause a sensing finger 2216, formed on the left-hand end of the lever, to feel a series of graduations formed on the rear end of the reverse tabulation slide. The graduations are indicated collectively by the reference number 2217 and are marked as follows in Figures 18a–d: "#2 stop"; "#3 stop"; "#4 stop"; and "Inactive."

The sensing lever 2207 bears a stud 2218, which lies above an arm 2219 formed on the pitman 1547. Hence, when the sensing lever feels one of the graduations on the slide, the stud 2218 will engage the arm 2219 and carry the pitman down with it to rock the lever 1542 (Figure 5) to cause said lever to set the reverse tabulation stop arm 1520 in position to cooperate with either the #4, the #3, or the #2 reverse tab stops 1398, 1397, and 1396, respectively. The reverse tab stops 1396, 1397, and 1398 are carried by the corresponding carriage stops 1374 (Figure 6) adjustably connected to a stop bar 1375 in turn removably fastened to a traveling carriage 1261 (Figures 1 and 22) mounted for horizontal shifting movement on the machine framework. The carriage is movable in either a forward tabulating direction or a reverse tabulating direction by a yieldable hydraulic driving mechanism, which is in turn driven by the operating motor.

Simultaneously with the lifting of the arm 1520, the lever 1542 also engages and rocks the lever 1522 clockwise (Figure 5) to cause the hydraulic driving mechanism to drive the carriage in a reverse tabulating direction, which movement is terminated by the selected stop contacting the face 1555 of the arm 1520.

In order to prevent an overthrow of the pitman as a result of the rather high-speed sensing movement of the lever 2207, the pitman is provided with a formed-over ear 2220, which is adapted to cooperate with a series of graduations 2221 formed in the rear end of the slide 2180 and positively stop the downward travel of the pitman at the proper point.

In Figure 14, the set-up of the shoulders 2200, 2201, and 2202 is such that the slide will be blocked against forward movement when either of the motor bars 2051 or 2052 is depressed. Hence, the sensing lever 2207 will be held up by the high spot on the slide, which lies beneath the sensing finger 2216 when the slide is in its home position, as shown in Figure 14. The reverse tabulation mechanism will therefore remain inactive when either of these two motor bars is operated. In the case of the main motor bar 2050, however, the shoulder 2201 is placed somewhat to the rear of the ear 2065, thereby permitting forward movement of the slide. The profile of this shoulder, however, is sufficiently low to permit the shoulder to pass beneath the ear 2065 when the motor bar is moved to its "touch" position, and in this case the slide will move all the way forward in the machine, and the graduation 2217 marked "O" will be positioned beneath the finger 2216, so as to prevent any sensing movement of the lever 2207. Hence, when the main motor bar is moved to its "touch" position, a reverse tabulation operation will not take place unless there is a control plate 1405 mounted in the carriage stop 1374 in this particular columnar position, which will cause the slide to be stopped in one of its intermediate positions. This control by the traveling carriage is exercised by way of a control lever 2222 (Figure 14), which is pivotally mounted on a stud 2223, which is supported between the auxiliary frame plate 2083 (see Figure 13) and the subsidiary plate 2095. The rear end of the control lever is pivotally connected to the lower end of a link 2224, which is pivotally connected at its upper end to the right-hand end of the sensing arm 1949 (Figure 8). The sensing lever 2222 has formed thereon a stop finger 2225, which is adapted to cooperate with a series of graduations 2226 formed on the slide 2180. As shown in Figures 18a to 18d inclusive, the reverse tabulation slide will be stopped in one of its four moved positions, depending on the length of the control plate 1405. This will cause the stop arm 1520 (Figure 5) to be set into a position to cooperate with a #2, #3, or #4 stop, with a #3 or #4 stop, with a #4 stop only, or not to be set at all where a control plate has been omitted from the carriage stop or the plate is cut so short as to permit the sensing member to move to its extreme limit of upward travel as determined by engagement of a shoulder 2227 (Figure 18d) on the member with the under side of the guide plate 1894.

Referring once again to the ear 2065 on the main motor bar 2050, it will be noted that, if the motor bar is moved to its "hold" position, the ear will then be in position to engage the shoulder 2201 and stop the slide in a position where the sensing finger 2216 will engage the "S" graduation 2217, thereby causing the stop arm 1520 to be elevated into a position to cooperate with either a #3 or a #4 reverse tab stop. It should be noted that no provision is made for setting the reverse tabulation mechanism to cooperate with a #1 stop 1385 (Figure 5) from the reverse tabulation slide 2180, due to the fact that only three lengths of control plates 1405 (A, S, and T) are available for controlling the positioning of the slide from the traveling paper carriage.

While in the preferred embodiment of the invention, as shown and described in the present drawings, the reverse tabulation slide has been provided with abutments for cooperating only with the ears 2063 and 2065, it is to be observed that the stems of the motor bars 2051 and 2052 are provided with formed-over ears 2228 (Figure 14), which may be arranged to cooperate with abutments similar to abutments 2200, 2201, and 2202 for controlling the positioning of the slide 2180. For example, the slide may be made, as shown in Figure 18b, with a shoulder 2229 for cooperating with the ear 2063 on the slide 2054 associated with the "Vertical" motor bar 2052 and with a shoulder 2230 for cooperating with the ear 2228 provided on the stem of this motor bar. Hence, if this motor bar is tapped lightly with the fingers (i. e., not held down), the ear 2228 will move down but will be immediately restored to the position shown in Figure 18b, whereas the ear 2063 will be held down in its "touch" position by the latch 2058 and will therefore be effective to cooperate with the shoulder 2229 to stop the slide in its "S" or #3 stop position, as shown in the figure. On the other hand, if the operator depresses the "Vertical" motor bar 2052 and retains it depressed throughout the machine cycle, the ear 2228 will engage the shoulder 2230 and thereby cause the slide to be stopped in its "T" or #2 stop position. Thus, additional flexibility of control by the motor bars may be obtained, if desired, by providing additional stop shoulders on the slide 2180 for cooperating with the ears 2228.

FORWARD TABULATING CONTROL

The means whereby the motor bars may control the forward tabulation mechanism includes the forward tabulation slide 2181 (Figure 15) slidably mounted on the studs 2081 and 2082 and urged toward the front of the machine by a spring, the same as the slide 2180. The forward tabulation slide is normally held in its home position by the rod 2105 but is released thereby during the cycling of the machine so as to permit it to sense the motor bars, after which it will be alined by movement of the bar 2192 into alining notches provided along the lower edge of the slide, all as described above in connection with the reverse tabulation slide. On the rear end of the slide is provided a series of graduations 2231, which are adapted to be sensed by a sensing lever 2232, which has a sensing finger 2233 formed thereon for engaging the graduations. This sensing lever is, like the sensing lever 2207, pivotally mounted on the stud 2208 and urged to rotate counter-clockwise by a spring 2234, which rotation, however, is controlled by the stud 2211 mounted in the upper end of the cam follower arm 2213.

The sensing lever is connected by a wire link 2235 to the lifting lever 1464 (see Figures 3 and 4) to thereby control the setting of the tab stop arm 1426 in relation to the forward tab stops 1381 and 1392 carried by the stop 1374 (see Figure 6). As indicated by the legends in Figures 17a and 17b, the slide will control the sensing lever to cause a skip-tab operation when the slide is blocked against any forward movement, a non-tab operation when the slide is permitted to partake of one step of forward movement, and a normal tabulating operation when the slide is permitted to move two steps forward. As in the case of the reverse tabulation slide, the forward movement of the slide 2181 is controlled by the motor bars, the slide being provided with abutment shoulders 2236, 2237, and 2238 for cooperating with the bent-over ears 2063 and 2065. With the arrangement illustrated herein, when the "Skip" motor bar is depressed, the slide will be blocked against any forward movement, and a skip-tab operation will therefore result. When the "Vertical" motor bar is operated, the slide will be permitted to move one step toward the front of the machine, thereby preventing any setting operation of the tab stop arm 1426 and hence causing a non-tab operation to take place. When the "Main" motor bar is moved to its "touch" position, the shoulder 2237 will move beneath the ear 2065 and the slide will be permitted to move all the way forward in the machine, thereby causing a normal tabulating operation. However, if the "Main" motor bar is moved to its "hold" position, the slide will be stopped after it is moved one step forwardly in the machine, and a non-tab operation will ensue.

Figure 15:
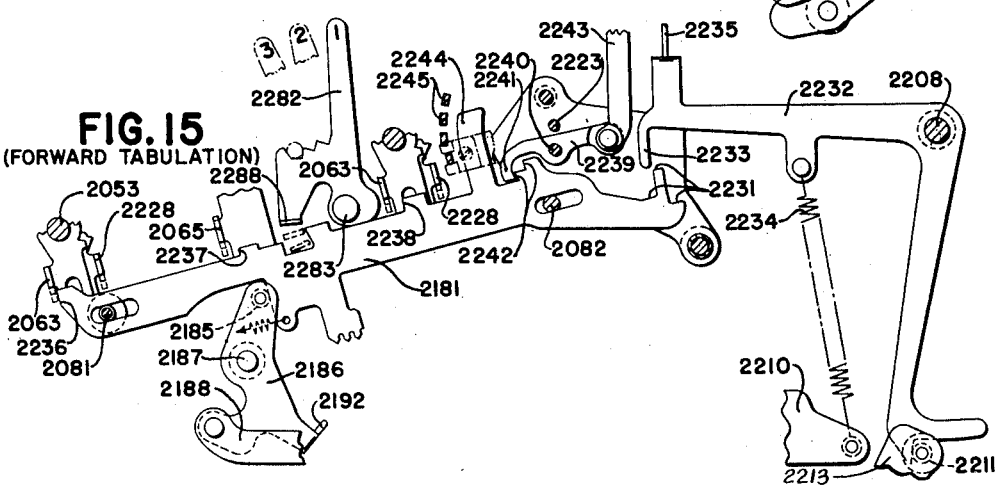
Figure 15 is a view which illustrates in detail the control by the motor bars and also by the traveling paper carriage over the forward tabulating control mechanism of the machine.

As in the case of the reverse tabulation slide, the forward tabulation slide 2181 may be controlled from a carriage stop, there being provided for this purpose a control lever 2239 (Figures 15, 17a, and 17b), which is pivotally mounted on a stud 2240 extending between the auxiliary frame plate 2033 and the subsidiary plate 2095. This lever is provided with a stop finger 2241, which is adapted to cooperate with a series of graduations 2242 formed on the upper edge of the slide to thereby control the positioning of the slide. The rear end of the lever 2239 is pivotally connected to the lower end of a link 2243, the upper end of which is pivotally connected to the right-hand end of the sensing arm 1939 (Figure 8). As schematically illustrated in Figures 17a and 17b, an "S" length control plate 1405, carried by the carriage stop 1374 (Figure 6), will cause the lever 2239 to be positioned so as to stop the slide after it has moved one step forwardly, thereby causing a non-tab operation to take place, while an "A" length control plate 1405 will elevate the stop finger to a position where it lies above the graduations 2242, thereby permitting the slide to move all the way forwardly and causing a normal tabulating operation to result. As illustrated by the dot-and-dash lines in Figure 17b, if no control plate is present, the lever will be elevated still more, so as to again permit a normal tab operation. However, if a "T" length control plate is present, the control lever 2239 will be very slightly elevated and the finger will cooperate with the first graduation, as illustrated in Figure 15, to thereby prevent any forward movement of the slide and cause a skip-tab operation to take place.

In order to insure that a reverse tabulation operation and a forward tabulation operation may not both be initiated during the same cycle of operation under the control of their respective slides, the forward tabulation slide 2181 is provided with an upstanding arm 2244, which is adapted to be engaged by a formed-over ear 2245 (Figures 14 and 15) on the sensing lever 2222 for the reverse tabulation slide. This ear will be effective to stop the tabulation slide 2181 after it has moved forward one step whenever an "A," "S," or "T" length control plate 1405 is effective to control the lever 2222, while the ear will be elevated clear above the arm 2244 if no control plate is present. Hence, it will be impossible, as a result of inadvertent operation of either the "Main" motor bar or the "Vertical" motor bar, to cause both a forward tabulating operation and a reverse tabulating operation to be called for during the same cycle.

In order to permit a "hold skip tab" operation to be controlled from the "Skip" motor bar (Figure 10), the lower end of the stem of this motor bar bears a stud 2250, which engages an aperture formed in the forward end of a lever 2251 pivotally mounted on a stud 2252 secured to the right side frame. The rear end of this lever is pivotally connected to the lower end of a link 2253 (see also Figure 4), the upper end of which is pivotally connected to the right-hand end of a depressor lever 2254 pivotally mounted on the stud 2143. The left-hand end of the lever is provided with a rounded nose 2255, which is adapted to engage an extension 2256 formed on the right-hand end of the tabulating stop arm 1426. The construction and arrangement of this mechanism are such that, when the "Skip" motor bar 2051 is moved to its "hold" position, the nose 2255 will engage the extension 2256 and depress the arm 1426 to its lowest effective position ("hold skip tab"), in which the surface 1427 is in the path of the stop 1393. Hence, a direct connection is provided between the "Skip" motor bar and the tab stop arm whereby the latter will always be moved to its "hold skip tab" position whenever the motor bar is depressed and held in its "hold" position.

PAPER FEED CONTROL

Figure 2:
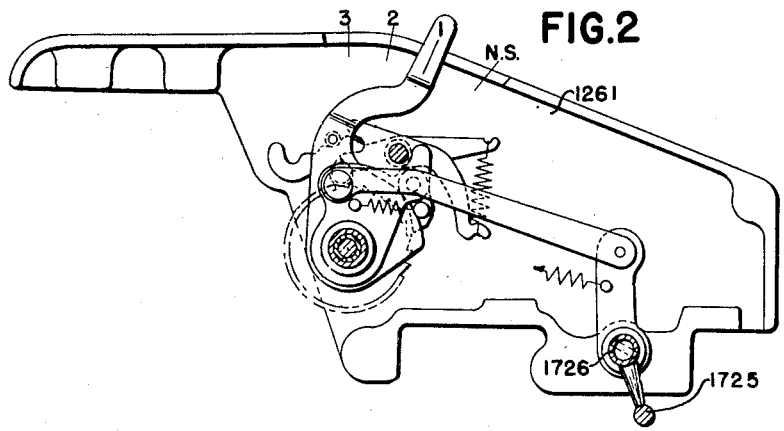
Figure 2 is a right side view of the paper feeding mechanism mounted on the traveling carriage.

The paper feed slide 2182, shown in Figure 20, is mounted in the machine for sliding movement in the same manner as the two previously-described slides and is released for forward movement in the machine by the rod 2185 and is likewise restored thereby in the same manner as the previously-described slides. The rear end of the slide is provided with a notch 2257 and is adapted to be sensed by a sensing finger 2258 provided on the forward end of a sensing lever 2259, which is pivotally mounted on the stud 2208 and is controlled by the stud 2211 mounted in the follower arm 2213 in the same manner as the previously-described sensing levers 2207 and 2232. The lever 2259 has a rearwardly-extending arm, to which is connected the upper end of a wire link 2260, the lower end of which is pivotally connected to an arm 2261 freely pivoted on the carriage throat shaft 1673. This arm is provided with a forwardly-extending finger 2262, which overlies the pin 1671 carried by the arm 1670, which is secured to the paper feed tube 1669. Hence, if the paper feed slide is moved to such a position as to enable the sensing finger to enter the notch 2257, the link 2260 will be elevated, thereby causing the finger 2262 to depress the pin 1671 and rock the tube 1669 counter-clockwise, so as to cause the paper feed clutch (Figure 7) to be engaged and operate the rail 1725 (Figure 1), which, through the mechanism shown in Figure 2, rotates the platen roll 539 to cause a line-spacing operation of said platen to result.

The paper feed slide is controlled in its forward movements by the shoulders 2263, 2264, and 2265, formed thereon, which are adapted to engage the ears 2063 and 2065 on the motor bars. As shown in Figure 20, the ear 2063 on the "Skip" motor bar will move in front of the shoulder 2263 and block any forward movement of the slide whenever this motor bar is operated. Thus, the sensing finger 2258 will be prevented from moving downwardly, and a paper feeding operation will be prevented. If the "Vertical" motor bar is depressed, the ear 2063, formed thereon, will engage the shoulder 2265 after the slide has moved one step forwardly, thereby placing the notch 2257 beneath the finger 2258 and so causing a paper feeding operation to take place. Similarly, the ear 2065 on the "Main" motor bar will engage the shoulder 2264 after the slide has moved one step forwardly, so as to cause a paper feeding operation to result, provided the motor bar is depressed to its "hold" position and held there during cycling of the machine. However, if this motor bar is depressed to its "touch" position, the shoulder 2264 will move beneath the ear 2065, and the high portion of the slide behind the notch 2257 will block the finger 2258 and prevent paper feeding.

This slide may also be controlled by the traveling paper carriage 1261 (Figures 1 and 22), there being provided for this purpose a control lever 2266 (Figures 16a, 16b, and 20), which is pivotally mounted on the stud 2249 and is provided with a stop finger 2267, which is adapted to engage a shoulder 2268 formed on the upper edge of the slide. The rear end of the lever 2266 is pivotally connected to the lower end of a link 2269, the upper end of which is pivotally connected to the right-hand end of the sensing arm 1935 (Figure 8). As schematically illustrated in Figures 16a and 16b, whenever an "S" or a "T" length control plate 1405 is present in the carriage stop 1374, the lever 2266 will be positioned so as to engage the shoulder 2268 and stop the slide after the latter has moved forwardly one step in the machine. This will place the notch 2257 beneath the sensing finger 2258 and thereby cause a paper feeding operation to take place. However, if an "A" length control plate or no control plate at all is present in the stop, the control lever 2266 will be elevated to a position where the finger 2267 lies above the shoulder 2268, and the slide will therefore be permitted to move two steps forward, so as to place a high portion of the slide beneath the finger 2258 and thereby prevent a paper feeding operation.

CARRIAGE THROAT CONTROL

The carriage throat slide 2183, illustrated in Figure 21, is operated in the same manner as the previously-described slides and is provided at its rear end with a shoulder 2270, which is adapted to be engaged by a sensing finger 2271 formed on the forward end of a sensing lever 2272 pivotally mounted on the stud 2208, the lever 2272 being controlled in its sensing movements by the stud 2211 in the upper end of the arm 2213. The lever 2272 has a rearward extension formed thereon, to which is pivotally connected the upper end of the wire link 1788, which, when pulled upwardly, will, through the lever 1785, the link 1789, and the arm 1791, cause the carriage throat shaft 1673 to be rocked counter-clockwise and thereby cause the carriage throat clutch (Figure 9) to be engaged and operate the rail 1809 (Figure 1), which, through the mechanism shown here, causes the front feed throat mechanism to be operated.

The carriage throat slide has provided along its upper edge shoulders 2273, 2274, and 2275, which are adapted to be engaged by the ears 2063 and 2065 of the motor bars. As shown herein, depression of either the "Skip" motor bar or the "Vertical" motor bar will cause the ears 2063 to move in front of the shoulders 2273 and 2275 and thereby block forward movement of the slide 2183. Thus, the sensing finger 2271 will be prevented from moving downwardly, and the carriage throat mechanism will not be operated. In the case of the "Main" motor bar, the ear 2065 will move in front of the shoulder 2274 when this motor bar is moved down to its "hold" position and thereby block forward movement of the slide, with the same result. However, if the "Main" motor bar is moved to its "touch" position, the shoulder 2274 will move beneath the ear, and the slide will move one step forward in the machine so as to bring the shoulder 2270 underneath the sensing finger 2271, thereby permitting the sensing lever 2272 to move counter-clockwise and rock the carriage throat shaft 1673 counter-clockwise, so as to cause the carriage throat mechanism to be operated.

As in the case of the previously-mentioned slides, the carriage throat slide may be controlled from the traveling carriage 1261 (Figures 1 and 22) so as to render the performance of this function entirely automatic. For this purpose, the slide is provided with a shoulder 2276 (Figures 19 and 21), which is adapted to cooperate with a stop finger 2277 formed on the forward end of a control lever 2278 pivotally mounted on the stud 2240. The rear end of the control lever is pivotally connected to the lower end of a link 2279, the upper end of which is pivotally connected to the link 2269 (see also Figure 20). As illustrated in Figures 19 and 21, when a "T" length control plate 1405 is present in the carriage stop, the stop finger 2277 will be positioned, by the finger 1889 and connected linkage, to engage the shoulder 2276 and prevent forward movement of the slide, thereby preventing operation of the carriage throat mechanism. However, when an "A" or an "S" length control plate is present, the stop finger will be elevated above the shoulder, and the slide will be free to move forward in the machine, so as to place the shoulder 2270 beneath the sensing finger 2271 and thus cause an operation of the carriage throat mechanism. If no control plate is present to limit the upward movement of the sensing finger 1889, the control lever 2278 will be rotated to its full extent, so as to bring a lug 2280, formed on the rear end of the lever, directly in front of a shoulder 2281 formed on the side 2183, so as to block forward movement of the slide and prevent an operation of the carriage throat mechanism.

It will be observed that the control lever 2278 for the carriage throat slide and the control lever 2266 for the paper feed slide are both connected to the same link 2269 and are therefore both controlled by the same sensing finger 1889. Hence, when an "A" length control plate is present in the carriage stop, the throat mechanism will be rendered operative, while the paper feed mechanism will be blocked against operation. When an "S" length control plate 1405 is present, both the carriage throat mechanism and the paper feed mechanism will be rendered operative. When a "T" length control plate is present in the carriage stop 1374, the paper feed mechanism will be rendered operative, while the carriage throat mechanism will be blocked. Hence, by selecting the proper length of control plate, either or both functions may be rendered effective.

MOTOR BAR CONTROL LEVER

*(Figures 13, 14, 15, 20, and 21)*

The control of the machine functions by the several motor bars, as described in the preceding section, may be modified by the operator of the machine by manipulation of a motor bar control lever 2282 (Figures 13, 14, 15, 20, and 23), which is pivotally mounted on a stud 2283 (Figure 14), which is secured to the auxiliary frame plate 2083. This lever is provided with three notches 2284, which are adapted to be resiliently engaged by a stud 2285 mounted on the end of a pivoted lever 2286 and drawn into engagement with the notches by a spring 2287. It will thus be seen that the lever 2282 may be moved to any one of three positions, thereby causing a formed-over ear 2288 on the lever to likewise assume any one of three positions. These positions of the lever 2282 have been designated by the numerals 1, 2, and 3 in the drawings.

As shown in the drawings, when the lever is in its No. 1 position, the ear 2288 will lie above the slides 2189 to 2183, inclusive, and will therefore not interfere with the normal operation of the slides. However, when the lever is moved to its No. 2 position, it will block the reverse tabulation slide and thus prevent a reverse tabulation operation from taking place and will also block the forward tabulation slide, so as to cause a skip tab operation to result. The paper feed slide will not be blocked by the ear 2288, thereby allowing it to move to the no feed position, and therefore the normal operation of the motor bars will not be interfered with. The carriage throat slide will be blocked by the ear, and hence the carriage throat mechanism will not be rendered operative when the "Main" motor bar is moved to its "touch" position. When the lever is moved to its No. 3 position, the control exercised thereby over the slides is the same as in the No. 2 position except in the case of the paper feed slide, which slide will be permitted only one step of forward movement when the lever is in its No. 3 position. Hence, a paper feeding operation will normally result even though an "A" length control plate 1405 or no control plate at all is present in the carriage stop and the "Main" motor bar is moved to its "touch" position. Hence, the No. 1 position of the lever 2282 may be referred to as its "normal" position, the No. 2 position as its "skip tab" position, and the No. 3 position as a "paper feed" or "vertical" position.

While the form of mechanism shown and described herein is admirably adapted to fulfill the objects primarily stated, it is to be understood that it is not intended to confine the invention to the particular embodiment disclosed herein but rather that it shall extend to all structures employing the principles taught herein.

What is claimed is:

1. In a machine of the class described, having a main operating mechanism, power means for giving the main operating mechanism cycles of operation, and a plurality of independently depressible motor-bars movable to either of two positions for initiating operation of the main operating mechanism by said power means, the combination of a plurality of individually operable means for controlling various functions of the machine, means operably connected with the main operating mechanism for giving each of said function controlling means a cycle of operation on each cycle of operation of the main operating mechanism; and means carried by each of said independently depressible motor bars and selectively movable to either of said two positions thereby controlling said function controlling means on each cycle of operation thereof so as to cause the machine to function in the desired manner.

2. In a machine of the class described, having a main operating mechanism and means for giving the main operating mechanism cycles of operation, the combination of a plurality of individually operable slides for controlling various functions of the machine; means operably connected with the main operating mechanism of the machine for giving each of said slides a reciprocatory movement on each cycle of operation of the main operating mechanism; and a plurality of manually operable motor bars each of which is selectively movable to either of two positions for controlling the reciprocatory movement of said slides as they are moved by the main operating mechanism to thereby cause the machine to function as desired.

3. In a machine of the class described, having a main operating mechanism, power means for giving the main operating mechanism cycles of operation, and a plurality of manipulative members for initiating operation of the main operating mechanism by said power mean, the combination of a plurality of individually operable slides, each of said slides relating to and serving to control a particular function of the machine; means operably connected with the main operating mechanism of the machine for giving each of said slides a forward and backward movement on each cycle of operation of the main operating mechanism; projections on said slides; and means on said manipulative members extending laterally across all of said slides and arranged to cooperate with the projections on said slides when said members are manipulated so as to enable the forward movement of the individual slides to be selectively controlled and thereby cause the machine to function as desired.

4. In a machine of the class described, having a main operating mechanism and means for giving the main operating mechanism cycles of operation, the combination of a plurality of coplanar slides, each of said slides relating to and serving to control a particular function of the machine; means operably connected with the main operating mechanism of the machine for giving each of said slides a forward and backward movement on each cycle of operation of the main operating mechanism; graduated projections on said slides; and a manipulative member selectively movable to either of two positions and having an abutment portion extending transversely across said slides, said abutment portion being adapted to cooperate with said graduated projections when said member is manipulated to either of its two positions so as to control the forward movement of one or more of said slides and thereby control the machine during the cycling of the main operating mechanism.

5. In a machine of the class described, having a main operating mechanism, power means for giving the main operating mechanism cycles of operation, and manipulative means for initiating operation of said main operating mechanism by said power means, said manipulative means having a partially depressed position and a fully depressed position, the combination of a plurality of adjoining coplanar slides, each of said slides relating to and serving to control a particular function of the machine; projections on said slides; means operably connected with the main operating mechanism of the machine for giving each of said slides a forward and backward movement on each cycle of operation of the main operating mechanism; abutment means on said manipulative means extending laterally across said slides and arranged to cooperate with said projections when said manipulative means is depressed; and latching means for retaining said manipulative means in its partially depressed position during a cycle of operation of the main operating mechanism, whereby the forward movement of the function controlling slides may be selectively controlled by the operator of the machine either by holding the manipulative means in its fully depressed position or by allowing it to be retained in its partially depressed position by said latching means.

6. In a machine of the class described, having a main operating mechanism and means for giving the main operating mechanism cycles of operation, the combination of a plurality of adjoining coplanar slides, each of said slides relating to and serving to control a separate function of the machine; projections on said slides; means operably connected with the main operating mechanism of the machine for yieldably urging each of said slides in one direction and then positively returning said slides in the opposite direction on each cycle of operation of the main operating mechanism; a plurality of separate control elements, each selectively operable to cooperate with the projections on said slides and thereby limit the movement of said slides in the forward direction; a set of graduated abutments on each of said slides; a feeler associated with each of said slides; means operatively connected with the main operating mechanism for controlling the engagement of said feelers with said graduated abutments after said slides have reached the limit of their travel in said one direction; and means connected with each of said feelers for controlling a particular function of the machine, whereby the position of each of said slides when sensed by said feelers will determine the manner in which each particular function of the machine is to be controlled.

7. In a machine of the class described, having a main operating mechanism and means for giving said mechanism cycles of operation, the combination of a pair of function control slides each adapted to control a particular function of the machine, said slides being movable from a normal position to any one of a plurality of moved positions; means for moving said slides on each operation of said machine from said normal position to one of said moved positions; means cooperating with said slides for controlling the functions of the machine in accordance with the positioning of said slides; and a manually operable function determining means movable to either of two positions for controlling the mode of operation of the machine, said means including a member movable in unison therewith to either of said two positions and cooperating with both of said slides so as to simultaneously control the movement thereof from said normal position to one of said moved positions.

8. In a machine of the class described having a main operating mechanism and means for giving said mechanism cycles of operation, the combination of a plurality of function control slides each adapted to control a particular function of the machine, said slides being movable from a normal position to any one of a plurality of moved positions; means for moving said slides on each operation of said machine from said normal position to one of said moved positions; abutments on said slides; selectively operable means cooperating with said abutments for controlling the positioning of said slides; graduated surfaces on said slides; a feeler associated with each of said slides, said feelers being operable under the control of said main operating mechanism to sense said graduated surfaces; and means connected with each of said feelers for controlling a particular function of the machine in accordance with the positioning of its related control slide.

9. In a machine of the class described, having a traveling paper carriage movable across the machine from one columnar position to another, a main operating mechanism, and means for giving said mechanism cycles of operation, the combination of a pair of function control slides each adapted to control a particular function of the machine, said slides being movable from a normal position to any one of a plurality of moved positions; means for moving said slides on each operation of said machine from said normal position to one of said moved positions; abutment surfaces on said slides; a positionable member associated with each of said slides and cooperating with the abutment surfaces thereof for controlling the movement of its related slide from said normal position to one of said moved positions, one of said members having a portion thereof arranged to overlie the abutment surfaces on the other of said slides so as to enable said member to simultaneously control the positioning of both of said slides; means controlled by said traveling paper carriage for determining the positioning of said members; graduated surfaces on said slides; a feeler mechanism for sensing said graduated surfaces on said slides; and means operable by said feeler mechanism for controlling certain functions of the machine whereby the performance of the machine will be determined in accordance with the positioning of said function control slides.

10. In a machine of the class described, having a traveling paper carriage movable across the machine from one columnar position to another, a main operating mechanism, and means for giving said mechanism cycles of operation, the combination of a pair of function control slides each adapted to control a particular function of the machine, said slides being movable from a normal position to any one of a plurality of moved positions; means for moving said slides on each operation from said normal position to one of said moved positions; abutment surfaces on said slides; a positionable member associated with each of said slides and cooperating with said abutment surfaces for controlling the movement of its related slide from said normal position to one of said moved positions, one of said members having a portion thereof arranged to overlie the abutment surfaces on the other of said slides so as to enable said member to simultaneously control the positioning of both of said slides; means controlled by said traveling paper carriage for determining the positioning of said members; graduated surfaces on said slides; a feeler mechanism for sensing said graduated surfaces on said slides; and means operable by said feeler mechanism for controlling certain functions of the machine whereby the operation of the machine will be determined in accordance with the columnar positioning of said traveling paper carriage.

11. In a machine of the class described, having a main operating mechanism and means for giving the main operating mechanism cycles of operation, the combination of a plurality of coplanar slides, each of said slides relating to and serving to control a particular function of the machine; means operably connected with the main operating mechanism of the machine for giving each of said slides a forward and backward movement on each cycle of operation of the main operating mechanism; projections on said slides; and a manipulative member movable from one position to a plurality of other positions and having formed thereon an element extending transversely across said slides, said element being adapted to cooperate with said projections on said slides when said member is manipulated and caused to move from said one position to one of said other positions so as to limit the forward movement of one or more of said slides in accordance with the position of said manipulative member to thereby control the functioning of the machine in accordance with the position of said manipulative member.

12. In a machine of the class described having a main operating mechanism and means for giving said main operating mechanism cycles of operation, the combination of a plurality of coplanar slides movable from an ineffective position to any one of a plurality of effective positions, each of said slides relating to and serving to control a particular function of the machine when positioned in one of said effective positions; means operatively connected with said main operating mechanism for moving each of said slides from said ineffective position to one of said effective positions during each cycle of operation of the main operating mechanism; projections on said slides; and a manipulative member capable of being moved from one position to a plurality of other positions, said member having a portion formed thereon which overlies each of said slides and is adapted to cooperate with said projections when said member is manipulated so as to stop one or more of said slides in one of their effective positions whereby the functioning of the machine during a cycle of operation of said main operating mechanism may be controlled as desired by suitable manipulation of said manipulative member.

13. In a machine of the class described, having a traveling paper carriage movable to various columnar positions, means for controlling the movement of said carriage from one columnar position to another, a main operating mechanism, and means for giving said main operating mechanism cycles of operation, the combination of a plurality of stop members on said carriage, said members being located thereon in positions corresponding to the various columnar positions of said carriage and each of said members being provided with a plurality of graduated abutment surfaces; means controlled by said main operating mechanism for sensing said members on each cycle of operation thereof; a slide for controlling a particular function of the machine, said slide being movable from an ineffective position to a plurality of effective positions and having formed thereon two sets of graduated abutments; means operable on each cycle of operation of the main operating mechanism for urging said slide to move from said ineffective position to one of said effective positions; a differentially positionable member cooperating with one of said sets of abutments for stopping said slide in any one of said effective positions; means for connecting said differentially positionable member with said sensing means so as to cause the position of said slide to be controlled in accordance with the columnar position of said carriage; means operable on each cycle of operation of the main operating mechanism for sensing the other of said sets of abutments on said slide; and means controlled by said sensing means for controlling the particular function represented by said slide.

14. In a machine of the class described, having a traveling carriage movable to various columnar positions, means for controlling the movement of said carriage to said various columnar positions, and operating means for imparting cycles of operation to the machine, the combination of a plurality of graduated abutment members mounted on the traveling carriage in relation to the various columnar positions thereof; means operated by the operating means for sensing the abutment members during each cycle of operation of the machine; means including a slide for controlling a particular function of the machine; means operating during each cycle of operation of the machine to urge the slide from an ineffective position to any one of a plurality of effective positions; a plurality of graduated abutments on the slide corresponding to the graduated abutment members on the traveling carriage; and a slide stop element operatively connected to the sensing means and selectively positioned by the graduated abutment members on the traveling carriage into the path of the corresponding graduated abutments on the slide to stop said slide in any selected one of its effective positions to cause said slide to control said particular function of the machine.

RAYMOND A. CHRISTIAN.
JESSE R. GANGER.

References Cited in the file of this patent

UNITED STATES PATENTS

| Number | Name | Date |
| --- | --- | --- |
| 1,946,572 | Crosman | Feb. 13, 1934 |
| 2,167,714 | Goldberg | Aug. 1, 1939 |
| 2,229,765 | Bower | Jan. 28, 1941 |
| 2,313,982 | Williams | Mar. 16, 1943 |